United States Patent Office 3,574,563
Patented Apr. 13, 1971

3,574,563
BERYLLIUM HYDRIDE COMPOUNDS
Frank C. Gunderloy, Jr., Woodland Hills, Louis R. Grant, Jr., Los Angeles, Ross I. Wagner, Woodland Hills, and Cliff Y. Fujikawa, Los Angeles, Calif., assignors to North American Rockwell Corporation
No Drawing. Filed May 12, 1965, Ser. No. 455,676
Int. Cl. C01b 6/24
U.S. Cl. 23—361                    4 Claims This invention relates to energetic compounds and a method of making same. More specifically, the invention relates to a new reaction to form new beryllium-containing compounds.

It is well known that beryllium is of great interest as a propellant fuel component since it is an extremely energetic element and serves to increase the performance of the fuels. Usually, the beryllium is combined with H in the form of beryllium hydride. The beryllium compounds can be incorporated into solid propellant formulations or used in liquid propellant applications.

Thus, an object of this invention is to provide a novel reaction wherein beryllium compounds useful particularly in propellant applications can be formed from the same basic reaction through the variance of the proportion of reactants.

The above and other objects of the invention are accomplished by the reaction of beryllium borohydride, $Be(BH_4)_2$, with an alkyl aluminum compound, $AlRR'R''$, wherein R, R' and R'' are selected from a class consisting of H and alkyl radicals of 1 to 8 C atoms and wherein at least one of the R's is an alkyl group. The reaction of the two compounds is generally carried out in the presence of a conventional hydrocarbon solvent at from about 0 to 100° C. Particularly good yields have been obtained at reaction temperatures of 60 to 65° C. When the reactants are present in equal molar quantities the reaction proceeds according to the following equation:

(1)
$$Be(BH_4)_2 + AlRR'R'' \xrightarrow[\text{Solvent}]{0-100°C} (BeH_2)_x\downarrow + AlB_2RR'R''H_3$$

The byproduct compound remaining dissolved in the solvent has not been separated for characterization but is predicted to be $AlB_2RR'R''H_3$. The $(BeH_2)_x$ formed is a solid. The alkyl aluminum compounds include, for example, methyl aluminum dihydride, butyl aluminum dihydride, dipropyl aluminum hydride, trioctyl aluminum and the like.

When an excess of alkyl aluminum compound is utilized, the reaction proceeds as follows:

(2)
$$\text{Excess } AlRR'R'' + Be(BH_4)_2 \xrightarrow[\text{0-60°C}]{\text{Solvent}}$$

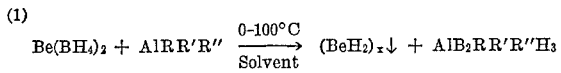

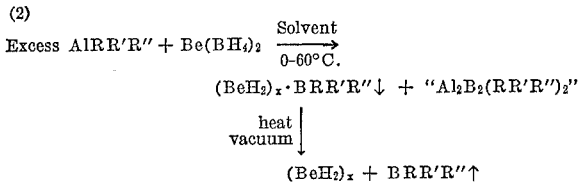

The initial precipitate of $(BeH_2)_x \cdot BRR'R''$ contains $(BeH_2)_x$ in amounts corresponding to 60 to 80 weight percent $(BeH_2)_x$ purity. The compound "$Al_2B_2(RR'R'')_2$" is merely predicted and has not been defined. The additional heating in vacuo drives off the alkyl boron compound, $BRR'R''$, leaving $(BeH_2)_x$ of 90 to 97 weight percent purity. The ratio of $AlRR'R''$ to $Be(BH_4)_2$ can vary from over 1:1 to 3:1. The compound $(BeH_2)_x$ is essentially the same as produced from reaction (1), $(BeH_2)_x$ is a polymeric type compound having the structure

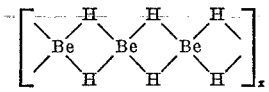

where x is an unknown which serves to indicate the polymeric nature of the compound.

Where an excess of $Be(BH_4)_2$ is utilized in a reaction, the compound $(BeH_2)_n(BH_3)_2$, where n can vary from 3 to 100, is formed according to the following reaction equation:

(3)
$$\text{Excess } Be(BH_4)_2 + AlRR'R'' \xrightarrow[\text{0-100°C}]{\text{Solvent}} (BeH_2)_n(BH_3)_2$$

The product is a solid having a calculated high impulse. Following will be a more detailed description of the three major reactions varying the relative relationships of the two reactive components utilized to form either (a) $(BeH_2)_x$ or (b) $(BeH_2)_n(BH_3)_2$ which are the desired end products.

(a) $(BeH_2)_x$

Prior to the invention, solid beryllium hydride had been formed according to the following reaction:

(4)

The beryllium hydride formed is thermally stable at ambient pressure to approximately 200° C. This form of beryllium hydride was not reactive to air, $H_2O$, $B_2H_6$, $Be(BH_4)_2$ and $Be(CH_3)_2$. The $(BeH_2)_x$ formed from reaction (2) in accord with this invention is generally about 70 weight percent pure when it first precipitates from the reaction with the major impurity being boron alkyl, $BRR'R''$. As indicated, the precipitate is generally heated in vacuo which drives off the $BRR'R''$ to give a 97 weight percent $BeH_2$. The $BeH_2$ produced from both reactions (1) and (2) appears to be considerably different in its behavior than that resulting from the reaction of prior art as indicated above. The $BeH_2$ of this invention is sensitive to air and moisture indicating a high degree of reactivity. For example, the $BeH_2$ reacts with $B_2H_6$ in accord with the following reaction to form a new compound hydroberyllium borohydride:

(5)
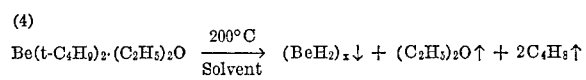

Additionally, the beryllium hydride of this invention reacts with $Be(BH_4)_2$ to form hydroberyllium borohydride. Neither of the above two reactions to form hydroberyllium borohydride transpires with the $BeH_2$ formed in the prior art. The compound $(HBeBH_4)_x$ was indicated previously but did not have the same properties nor was it prepared in the same manner as the $(HBeBH_4)_2$ formed in Equation 5. Thus it can be seen that a new form of beryllium hydride having different physical properties from that presently existing in the prior art has resulted from the novel reaction of this invention.

(b) $(BeH_2)_n(BH_3)_2$

One of the most interesting products formed from the basic reaction of the invention is that resulting from Equation 3 wherein the product $(BeH_2)_n(BH_3)_2$ is formed. In order to obtain this product, an excess of $Be(BH_4)_2$ is utilized. The product formed is a polymeric-type compound having the following structural configuration:

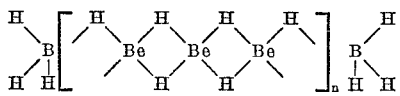

where $n$, as previously noted, is a whole integer from 3 to 100. It is noted that the $BeH_2$ repeats itself in the chain with the $BH_3$ used as a chain terminator at each end. It has been found that the higher the ratio of $Be(BH_4)_2$ to the AlRR'R'' the shorter the chain obtained. The compound formed will be referred to as a borane-terminated beryllium hydride. It is a white non-volatile solid. The value of $n$ or length of the polymer is determined by the solvent and ratios of $Be(BH_4)_2$ to AlRR'R''. Aromatic solvents such as benzene give a higher $n$ value than aliphatics. Other examples of solvents include cyclohexane, isopentane, ethane, hexadecane, mineral oil, toluene and the like. Additionally, the more $Be(BH_4)_2$ present, the shorter the chains or lower the $n$ value. The borane-terminated beryllium hydride formed is inert to air, atmospheric moisture, and water at room temperature. It possesses good thermal stability which is indicated by no loss of hydrogen after being heated for two hours at 150° C. in a vacuum.

The borane terminated beryllium hydrides of the invention possess advantages for utilization as a rocket fuel over the previously utilized beryllium hydride. It is well known that impulse of fuels can be related to hydrogen content or content of low molecular weight constituents. It is thus desirable to keep the molecular weight of the exhaust products as low as possible so that higher impulses can be derived. As a result it has been found that the borane-terminated beryllium hydride possesses a higher theoretical $H_2$ content than beryllium hydride. $H_2$ content expressed as a percentage was calculated according to the following equation:

$$\frac{\text{Hydrolyzable } H_2 \text{ (mmoles mg.)} \times 100}{0.1814} = \text{Hydrogen Content}$$

The $H_2$ content is thus a measure of hydrogen per unit mass as compared to that found in pure beryllium hydride which gives 0.1814 mmole $H_2$ per milligram upon hydrolysis. As a result, the material of this invention which has $BH_3$ groups as terminators always product theoretical $H_2$ contents greater than 100 percent since the $BH_3$ group yields more hydrogen per unit mass than does a $BeH_2$ group. The increase in specific impulse obtained has been shown by way of calculations from a theoretical hybrid system using $H_2O_2$ as an oxidizer. In such a system wherein the theoretical chamber pressure is 1000 p.s.i.a. and the exit pressure is 14.7 p.s.i.a., beryllium hydride has an impulse of approximately 357 seconds. The borane-terminated beryllium hydride compound wherein $n$ is greater than 10 has an impulse of up to 359.5 seconds, for example where $n$ equals 35–40. The following specific examples disclose the preparation of the compounds of this invention:

EXAMPLE I

The reaction of alkyl aluminum compound and the beryllium borohydride of the invention was conducted in glass bulbs of 100–200 mls. capacity containing magnetic stirrers and fitted with a Fischer-Porter valve. A standard ball joint for attachment to a vacuum system was provided. The solvent utilized in the reaction and the alkyl aluminum compound were loaded in a dry box. The bulbs were then attached to a vacuum system. The beryllium borohydride was first sublimed into the bulbs and its weight was obtained by differential weighings on a storage container. The bulb was then immersed to the valve in a heated oil bath. After reaching the desired temperature, the solutions formed remained clear for 1 to 4 hours before a precipitate appeared. After heating, the bulbs were returned to the dry box and cut open, and the precipitated products isolated by filtration. In this example, the reaction was run utilizing essentially equal molar quantities of the alkyl aluminum compound and beryllium borohydride. Thus 18.1 mmoles of triethylaluminum, $Al(C_2H_5)_3$, and 18.8 mmoles of sublimed beryllium borohydride, $Be(BH_4)_2$ were utilized. The triethylaluminum was dissolved in 50 mls. of benzene before the sublimed beryllium borohydride was added. The mixture was stirred at ambient temperature overnight. This was followed by heating the composition from 25–60° C. for one hour and then 55–60° C. for five hours. The solution remained clear at ambient temperatures. Precipitation of the solid product began after one hour of heating. The product isolated by filtration was 83 weight percent pure $(BeH_2)_x$ in a yield of 230 mgs.

EXAMPLE II

The procedure and apparatus of Example I was repeated utilizing an excess of the alkyl aluminum compound. In this example 36.7 mmoles of tri-n-propyl aluminum was solved in 20 mls. of normal hexane as a solvent. Into the dissolved aluminum alkyl compound was then sublimed 30.2 mmoles of beryllium borohydride. The reaction flask was heated at 30–55° C. for two hours followed by heating from 50–55° C. for three hours. It was observed that the solution was clear for approximately three hours and rapidly deposited a large amount of white precipitate. Analysis of the precipitate showed that it was 75 weight percent pure $(BeH_2)_x$. This precipitate was then heated to 100° C. in vacuo for five hours to give a final $(BeH_2)_x$ product of 97 weight percent purity.

EXAMPLE III

To form the borane-terminated beryllium hydride of the invention, the procedure of Example I was repeated utilizing 15.5 mmoles of tri-n-propyl aluminum dissolved in 40 mls. of normal hexane as a solvent. To the aluminum alkyl was added 30 mmoles of beryllium borohydride by sublimation. The mixture was heated at 26–55° C. for one hour and then continued at 55–59° C. for three hours. It was observed that some beryllium borohydride was undissolved throughout the procedure. Precipitation of the solid product began during the first hour of heating. The product analysis indicated an $H_2$ content of 102 percent based on the equation for this determination previously given. The beryllium weight percent of the composition was 65.2, the weight percent of the boron was 10.4. These analysis correspond to the composition

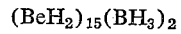
$(BeH_2)_{15}(BH_3)_2$

Two hundred milligrams of the borane-terminated beryllium hydride were obtained.

EXAMPLE IV

The procedure of Example III was repeated utilizing 21.6 mmoles of triethylaluminum in 50 mls. of benzene as a solvent. To the alkyl aluminum was added 59.1 mmoles of beryllium borohydride by sublimation. The mixture was heated at 50–54° C. for four hours. Two hundred seventy milligrams of a borane-terminated beryllium hydride was obtained having the composition

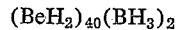
$(BeH_2)_{40}(BH_3)_2$

Although the invention has been described and illustrated in detail, it is to be clearly understood that the same is by way of illustration and example only and is not be taken by way of limitation, the spirit and scope of this invention being limited only by the terms of the appended claims.

We claim:
1. The process of forming beryllium hydride compounds according to the reaction of $Be(BH_4)_2$ with $AlRR'R''$ wherein, R, R' and R'' are selected from the class consisting of H and alkyl radicals of 1 to 8 carbon atoms and wherein at least one of said R's is an alkyl group.
2. Forming the compounds according to claim 1 wherein said reaction occurs in the presence of an organic solvent and at a temperature of from 0–100° C.
3. The process of claim 1 wherein said $AlRR'R''$ is present in at least an equimolar quantity to said $Be(BH_4)_2$
4. $(BeH_2)_n(BH_3)_2$ wherein $n$ varies from 3 to 100.

No references cited.

LELAND A. SEBASTIAN, Primary Examiner

U.S. Cl. X.R.

23—363, 365; 149—22; 260—448